United States Patent
Chen et al.

(10) Patent No.: US 11,695,444 B2
(45) Date of Patent: Jul. 4, 2023

(54) TRANSCEIVER CIRCUIT AND METHOD FOR COMPENSATING FOR TRANSMISSION POWER DEVIATION

(71) Applicant: Realtek Semiconductor Corp., HsinChu (TW)

(72) Inventors: Beng-Meng Chen, HsinChu (TW); Chien-Jung Huang, HsinChu (TW); Jhih-Yuan Ke, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 78 days.

(21) Appl. No.: 17/558,613

(22) Filed: Dec. 22, 2021

(65) Prior Publication Data

US 2022/0337280 A1 Oct. 20, 2022

(30) Foreign Application Priority Data

Apr. 16, 2021 (TW) ................. 110113794

(51) Int. Cl.
*H04B 1/40* (2015.01)
*H04B 15/00* (2006.01)

(52) U.S. Cl.
CPC ............ *H04B 1/40* (2013.01); *H04B 15/00* (2013.01)

(58) Field of Classification Search
CPC ...................................................... H04B 1/40
See application file for complete search history.

(56) References Cited

U.S. PATENT DOCUMENTS

| | | | | |
|---|---|---|---|---|
| 5,541,759 A | * | 7/1996 | Neff | H04B 10/275 |
| | | | | 398/154 |
| 2011/0158047 A1 | * | 6/2011 | Beffa | G01V 1/223 |
| | | | | 367/40 |
| 2017/0230022 A1 | * | 8/2017 | Lee | H03G 3/00 |
| 2019/0147827 A1 | * | 5/2019 | Wu | G09G 3/3677 |
| | | | | 345/214 |

FOREIGN PATENT DOCUMENTS

| | | |
|---|---|---|
| CN | 100544451 C | 9/2009 |
| CN | 102844981 A | 12/2012 |

\* cited by examiner

*Primary Examiner* — Hsinchun Liao
(74) *Attorney, Agent, or Firm* — Winston Hsu

(57) ABSTRACT

A transceiver circuit includes a counter device, a compensation circuit and an adjusting circuit. The counter device is configured to count an execution time of a reception operation and accordingly generate a counting result. The compensation circuit is coupled to the counter device and configured to receive the counting result, determine a plurality of compensation values according to the counting result and sequentially output the compensation values in a transmission operation. The transmission operation follows the reception operation. The adjusting circuit is coupled to the compensation circuit, and configured to receive the compensation values and sequentially adjust amplitude of a signal according to the compensation values in the transmission operation. The compensation values are respectively applied to different portions of the signal.

14 Claims, 5 Drawing Sheets

| Execution time of reception operation(us) \ Time in the packet(us) | 0-50 | 50-150 | 150-350 | 350-650 | 650-1000 | 1000-1500 | 1500-3000 | 3000-4500 | >4500 |
|---|---|---|---|---|---|---|---|---|---|
| 0-600 | 0 | 0.01 | 0.02 | 0.03 | 0.04 | 0.05 | 0.06 | 0.07 | 0.08 |
| 600-1200 | 0 | 0.02 | 0.04 | 0.06 | 0.08 | 0.10 | 0.12 | 0.14 | 0.16 |
| 1200-5000 | 0 | 0.03 | 0.06 | 0.09 | 0.12 | 0.15 | 0.18 | 0.21 | 0.24 |
| 5000-10000 | 0 | 0.04 | 0.08 | 0.12 | 0.16 | 0.20 | 0.24 | 0.28 | 0.32 |
| >10000 | 0 | 0.05 | 0.1 | 0.15 | 0.2 | 0.25 | 0.3 | 0.35 | 0.4 |

TRANSCEIVER CIRCUIT AND METHOD FOR COMPENSATING FOR TRANSMISSION POWER DEVIATION

BACKGROUND OF THE INVENTION

1. Field of the Invention

The invention relates to a transceiver circuit and method for compensating for transmission power deviation.

2. Description of the Prior Art

The amplifier circuit is a circuit often used in communication systems to increase the output power of the signal. The amplifier circuit obtains power from the power source such as a power supply, and controls the waveform of the output signal to be consistent with the input signal, but with larger amplitudes. The signal amplified by the amplifier circuit will be received by the receiving end. The receiving end uses the received signal to estimate an appropriate signal gain and then processes the subsequently received signal according to the estimated gain.

Since the gain of the amplifier circuit decreases as the temperature of the circuit itself or the environment increases, even when the setting of the amplifier circuit remains unchanged, the transmission power of the signal may still change due to the temperature changes. For example, the settings of the amplifier circuit are usually remaining unchanged during the transmission of a packet. However, since the temperature of the amplifier circuit continues to rise during the process of transmitting the packet, the problem of different transmission power for different portions of the packet occurs. This problem becomes more serious when the packet length is very long, because there is a significant difference in the transmission power at the beginning and the end of the packet.

Because the receiving end usually uses the demodulation result of the preamble of a packet to determine the value of the gain used to process the packet thereafter, if the transmission power difference of the same packet is too large, it will cause a bad transmitting end error vector magnitude (EVM) measurement result.

To solve this problem, a novel structure of a transceiver circuit capable of compensating for transmission power deviation and a method for compensating for transmission power deviation are required.

SUMMARY OF THE INVENTION

It is an objective of the invention to solve the problem of large difference in transmission power of the same packet.

According to an embodiment of the invention, the transceiver circuit comprises a counter device, a compensation circuit and an adjusting circuit. The counter device is configured to count an execution time of a reception operation and accordingly generate a counting result. The compensation circuit is coupled to the counter device and configured to receive the counting result, determine a plurality of compensation values according to the counting result and sequentially output the compensation values in a transmission operation. The transmission operation follows the reception operation. The adjusting circuit is coupled to the compensation circuit and configured to receive the compensation values and sequentially adjust an amplitude of a signal according to the compensation values in the transmission operation. The compensation values are respectively applied to different portions of the signal.

According to another embodiment of the invention, a method for compensating for transmission power deviation comprises: calculating an execution time of a reception operation of a transceiver circuit; determining a plurality of compensation values according to the execution time of the reception operation; and sequentially adjusting an amplitude of a signal according to the compensation values in a transmission operation of the transceiver circuit, wherein the transmission operation follows the reception operation, and the compensation values are respectively applied to different portions of the signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 shows exemplary content of a compensation table according to an embodiment of the invention.

DETAILED DESCRIPTION

The transceiver circuit of a communication system is usually used to perform operations of signal transmission and reception. However, as mentioned above, the conventional transceiver circuit has the problem of significant difference in the transmission power within the same packet. For example, when the transceiver circuit performs a transmission operation after a long reception operation, significant difference in the transmission power occurs in the subsequent transmission operation. The reason for generating the significant transmission power difference is that the power amplifier in the transmission signal processing path does not operate in the period or the time interval during which the transceiver circuit is performing the reception operation, so the temperature of the power amplifier will gradually drop. The longer the execution time of the reception operation, the greater drop in temperature of the power amplifier is generated. The temperature of the power amplifier starts to increase when the power amplifier starts to operate in response to the execution of the transmission operation.

However, since the gain of the power amplifier decreases as the temperature of itself or the environment increases, such temperature changes will cause the gain of the power amplifier to decrease in the period or the time interval during which the transmission operation is performed, which in turn causes the transmission power of the signal to change.

Figure 1:
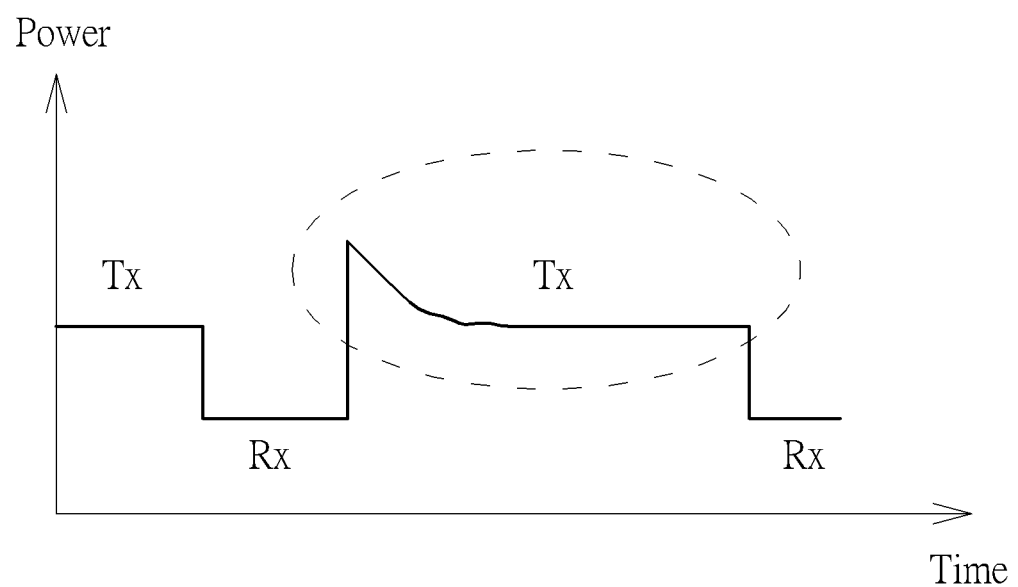
FIG. 1 is a schematic diagram showing exemplary signal power.

FIG. 1 is a schematic diagram showing exemplary signal power, in which Tx represents the period or the time interval during which the transmission operation is performed and Rx represents the period or the time interval during which the reception operation is performed. As shown in the area surrounded by a dashed circle in FIG. 1, the signal power continues to decrease during the period or the time interval of performing the transmission operation. Such a problem becomes more serious when the length of the packet to be transmitted is very long, because the transmission power at the beginning and the end of the packet is significantly different. To solve this problem, a novel structure of a transceiver circuit and an associated method for compensating for transmission power deviation of a transceiver circuit are required.

Figure 2:
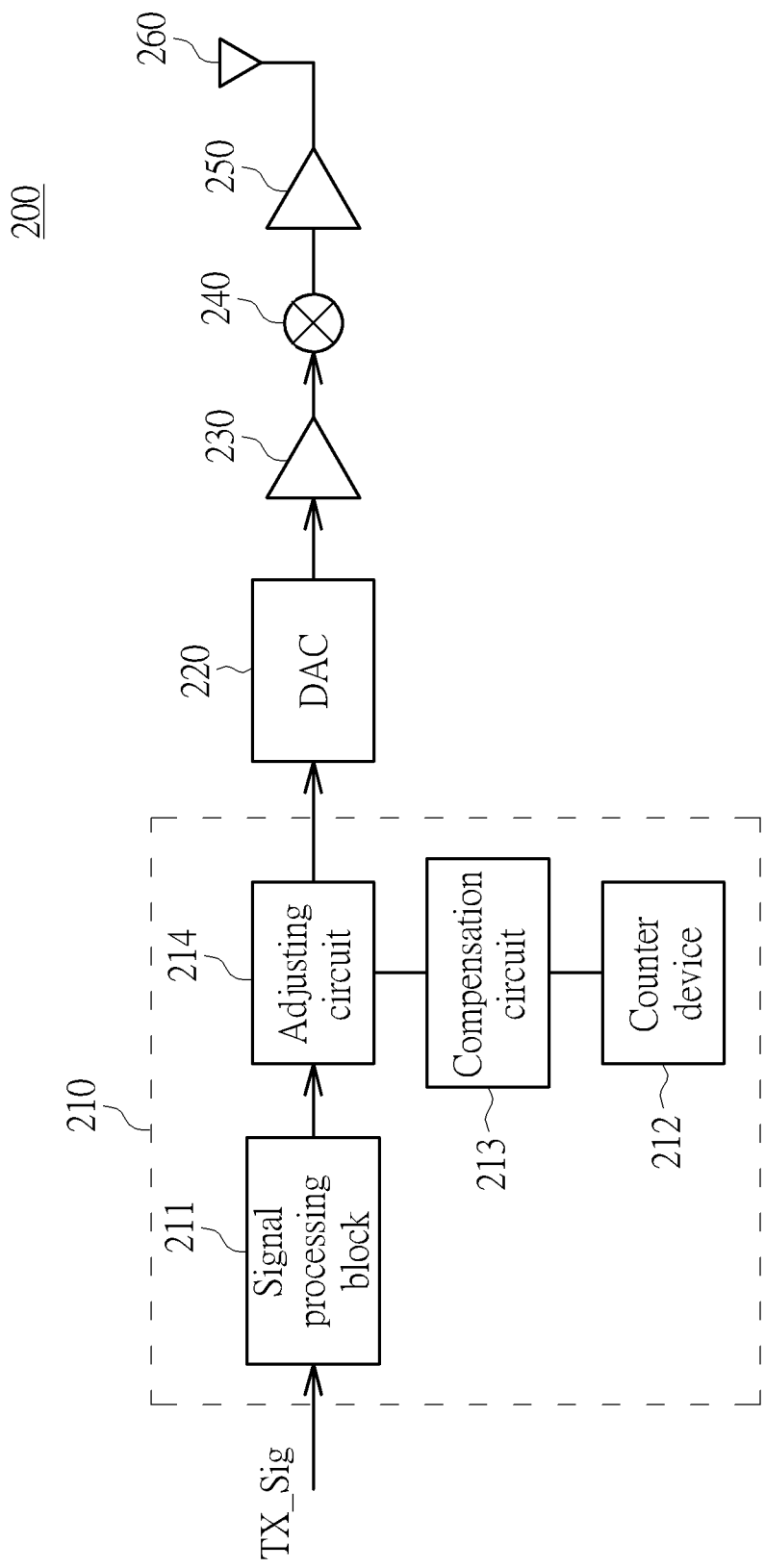
FIG. 2 shows a block diagram of a transceiver circuit according to an embodiment of the invention.

FIG. 2 shows a block diagram of a transceiver circuit according to an embodiment of the invention. The transceiver circuit 200 may comprise a baseband signal processing device 210, a Digital to Analog Converter (DAC) 220, an analog amplifier 230, a mixer 240, a power amplifier 250 and an antenna 260.

It is to be noted that FIG. 2 is a simplified diagram of a transceiver circuit, in which only a part of the components on the transmission signal processing path are shown. As will be readily appreciated by a person of ordinary skill in the art, a communication device may further comprise other components not shown in FIG. 2, for example, the components on the reception signal processing path and other components on the transmission signal processing path configured for implementing the functions of wireless communication and related signal processing.

The baseband signal processing device 210 is configured to receive and process the signal TX_Sig to be transmitted. The DAC 220 is configured to convert the processed signal TX_Sig from the digital domain to the analog domain. The analog amplifier 230 is configured to amplify the signal TX_Sig in the analog domain. The mixer 240 is configured to up-convert the signal TX_Sig from the frequency domain of the baseband frequency to the frequency domain of the radio frequency. The power amplifier 250 is configured to amplify the radio frequency signal before it is transmitted out by the antenna 260.

According to an embodiment of the invention, the baseband signal processing device 210 may comprise a signal processing block 211, a counter device 212, a compensation circuit 213 and an adjusting circuit 214. The signal processing block 211 is configured to process baseband signals. The counter device 212 is configured to count an execution time of a reception operation of the transceiver circuit 200 and accordingly generate a counting result. The compensation circuit 213 is coupled to the counter device 212 and configured to receive the counting result, determine a plurality of compensation values according to the counting result and output the compensation values. The adjusting circuit 214 is coupled to the compensation circuit 213 and configured to receive the compensation values and sequentially adjust amplitude of the signal to be transmitted in the transmission operation according to the compensation values, wherein this transmission operation follows the aforementioned reception operation.

According to an embodiment of the invention, the compensation values determined based on the execution time of the reception operation (for example, the aforementioned counting result) may be respectively applied to different portions of the signal. In some embodiments, the compensation circuit 213 may sequentially provide (output) a compensation value to the adjusting circuit 214 during the transmission operation, so that the adjusting circuit 214 may immediately apply the compensation value to the corresponding portion of the signal in real-time. In some other embodiments, the compensation circuit 213 may also directly provide the compensation values to the adjusting circuit 214 and the adjusting circuit 214 may select the corresponding compensation value to adjust the signal amplitude according to the execution time of the transmission operation.

According to an embodiment of the invention, the compensation circuit 213 may be implemented as a hardware table circuit. For instance, the compensation circuit 213 may comprise a plurality of control logics to implement a look-up table. In the embodiments of the invention, the compensation circuit 213 may store or record a plurality of compensation settings. Each compensation setting may comprise a plurality of corresponding compensation values, and these compensation settings respectively correspond to different lengths of execution time (for example, execution time of the reception operation). The compensation circuit 213 may select an appropriate compensation setting from these compensation settings according to the counting result of the counter device 212.

FIG. 3 shows exemplary content of a compensation table according to an embodiment of the invention. According to an embodiment of the invention, the compensation table 300 may record a plurality of compensation settings. For example, each row in FIG. 3 corresponds to one compensation setting. Each compensation setting corresponds to a period of execution time of a reception operation. For example, the 0-600 microsecond (us), 600-1200 us . . . etc. as shown in FIG. 3. In addition, each compensation setting comprises a plurality of compensation values and each compensation value corresponds a period of time in a packet, for example, the 0-50 us, 50-150 us . . . etc. as shown in FIG. 3.

Suppose that the currently calculated execution time of the reception operation or the counting result of the execution time of the reception operation is 3000 us, the compensation circuit 213 may select the third compensation setting correspondingly based on this information, and may sequentially provide the compensation value at the corresponding time during the transmission operation to the adjusting circuit 214, so that the adjusting circuit 214 may adjust the corresponding portion of the signal according to the compensation value in real-time. For example, the compensation circuit 213 may provide a 0.03 decibel (dB) compensation value to the adjusting circuit 214 when the transmission operation has been performed for 50 milliseconds or when the baseband signal processing device 210 is processing the portion corresponding to the 50-th millisecond of the packet (that is, the packet to be transmitted in the current transmission operation). Then, the compensation circuit 213 may provide a 0.06 decibel (dB) compensation value to the adjusting circuit 214 when the transmission operation has been performed for 150 milliseconds or when the baseband signal processing device 210 is processing the portion corresponding to the 150-th millisecond of the packet, and the rest may be deduced by analogy. The adjusting circuit 214 may perform a voltage amplifying operation on the signal according to the received compensation value. For example, in an embodiment of the invention, the compensation value received by the adjusting circuit 214 may be a ratio of voltage amplification. Assuming that the amplitude of the signal before compensation is 0.03 mV (millivolt), the adjusting circuit 214 may amplify the amplitude of the signal to 0.0301 mV be based on the 0.03 dB compensation value, and so on.

Continuing the previous example, in the embodiments of the invention, the adjusting circuit 214 applies a compensation value of 0.03 dB to the 50-th to 150-th millisecond portion of the packet, and applies a compensation value of 0.06 dB to the 150-th to 350-th millisecond portion of the packet, and so on, until the end of the transmission operation or the end of the packet.

According to an embodiment of the invention, the adjusting circuit 214 may be a digital voltage amplitude output adjuster, for further adjusting the voltage amplitude of the baseband signal after the signal processing block 211. For example, the adjusting circuit 214 may amplify the voltage amplitude of the baseband signal according to a predetermined gain value, so that the voltage amplitude of the baseband signal meets the basic transmission requirements. Besides the original amplification operation, in the embodiment of the invention, the adjusting circuit 214 may further or additionally adjust the voltage amplitude of the baseband signal in the digital domain according to the compensation value provided by the compensation circuit 213 as described in the above example. Therefore, the adjusting circuit 214 may adjust the amplitude of the baseband signal according to a summation of the predetermined gain value and the compensation value, where the compensation value is used to pre-compensate for the deviation or the offset in the transmission power of the signal possibly generated by the temperature change of the power amplifier.

According to an embodiment of the invention, the compensation values comprised in a compensation setting may form an increasing sequence. That is, the compensation values comprised in a compensation setting increase as the execution time of transmitting the packet increases, such as the exemplary compensation values shown in FIG. 3. In addition, as discussed above, each compensation setting corresponds to a different length of execution time. In the embodiments of the invention, the longer the execution time of the reception operation, the greater the compensation values comprised in the compensation setting corresponding to this execution time would be. For example, in the example shown in FIG. 3, the longer the execution time of the reception operation, the greater the voltage amplification ratio would be.

According to an embodiment of the invention, the counter device 212 may start counting the execution time of the reception operation in response to a receiving command and stop counting the execution time when the reception operation is ended. For example, the transceiver circuit 200 may perform signal transmitting and receiving operations in compliance with a predetermined communication protocol, wherein one communication protocol layer (for example, the medium access control (MAC) layer) may issue the corresponding transmitting or receiving command based on the current transmitting or receiving requirement. In response to the receiving command, the baseband signal processing device 210 may control the antenna 260 to receive signal and control the corresponding radio frequency signal processing device (not shown) to process the received signal. In response to the transmitting command, the baseband signal processing device 210 may perform corresponding signal processing on the signal to be transmitted, control the subsequent circuit (including the radio frequency signal processing device) to perform the corresponding signal processing, and control the antenna 260 to send out the processed signal.

Therefore, in an embodiment of the invention, the counter device 212 may start to calculate the execution time of the reception operation in response to the receiving command issued by the MAC layer. Similarly, the counter device 212 may stop counting in response to a transmitting command issued by the MAC layer thereafter, or stop counting in response to an end receiving command issued by the MAC layer.

Figure 4:
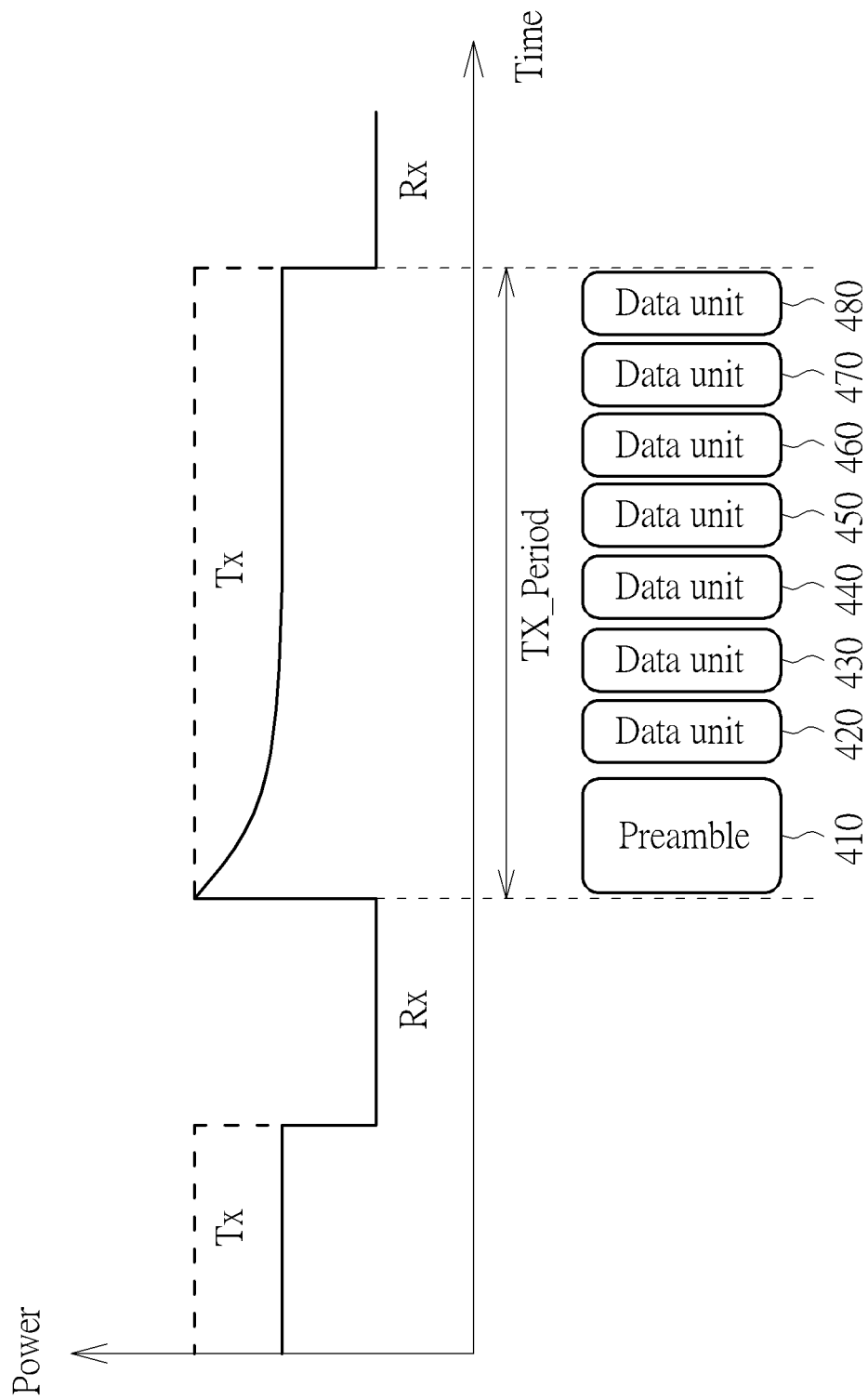
FIG. 4 is a schematic diagram showing the power of a signal according to an embodiment of the invention.

FIG. 4 is a schematic diagram showing the power of a signal according to an embodiment of the invention. The solid line shows the waveform of uncompensated transmission power, and the dashed line shows the waveform after the compensation has been performed by the proposed transceiver circuit according to the corresponding method for compensating for transmission power deviation. Assuming that the transceiver circuit 200 transmits a packet in the period TX_Period during the transmission operation, where the packet comprises the preamble 410 and a plurality of data units 420-480. According to an embodiment of the invention, since for the transceiver circuit 200, the start time of the transmission operation and the packet or data length are known, the adjusting circuit 214 may directly perform compensation at the corresponding time of the packet according to the corresponding compensation values in response to a system clock signal (not shown). For example, the adjusting circuit 214 may apply the first compensation value to the data unit 420 in response to the system clock signal, apply the second compensation value to the data unit 430 in response to the system clock signal, and so on. After the transmission power deviation or offset is compensated, the packet output by the power amplifier 250 has a more stable output power, or the power difference within the same packet can be reduced. For example, as the waveform shown by the dashed line in FIG. 4, the transmission power of the preamble portion of the packet (for example, preamble 410) is substantially the same as the transmission power of the data portion (for example, data units 420-480) of the packet.

In an embodiment of the invention, the adjusting circuit 214 may perform transmission power compensation within the same packet according to the execution time of the current transmission operation and the execution time of a pervious reception operation. However, the invention is not limited to this. The adjusting circuit 214 may also perform transmission power compensation between different packets according to the execution time of the current transmission operation and the execution time of a pervious reception operation.

In addition, as illustrated in the aforementioned embodiments, the proposed method for compensating for transmission power deviation may be implemented by the hardware circuits such as the counter device 212, the compensation circuit 213 and the adjusting circuit 214. However, the invention is not limited to this. In some embodiments of the invention, the proposed method for compensating for transmission power deviation may also be implemented by software or firmware. In addition, the proposed method for compensating for transmission power deviation and the corresponding hardware structure are compatible with the current existing transceiver circuits.

Figure 5:
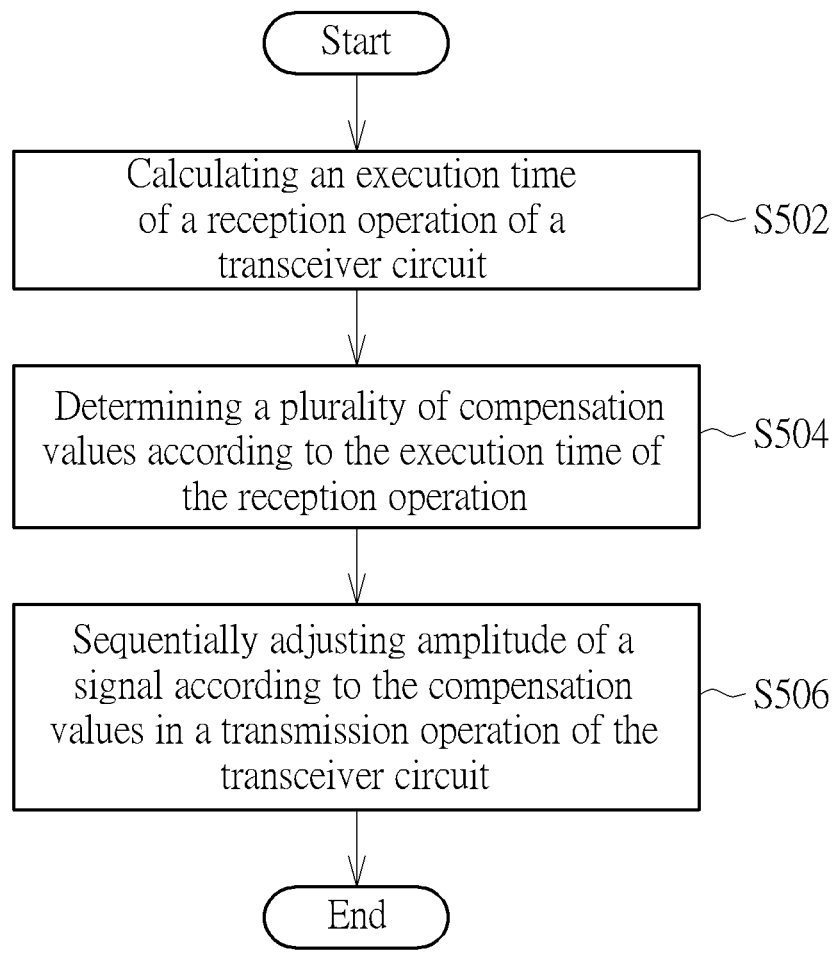
FIG. 5 shows a flow chart of a method for compensating for transmission power deviation according to an embodiment of the invention.

FIG. 5 shows a flow chart of a method for compensating for transmission power deviation according to an embodiment of the invention. The method for compensating for transmission power deviation comprises:

Step S502: Calculating an execution time of a reception operation of a transceiver circuit.

Step S504: Determining a plurality of compensation values according to the execution time of the reception operation.

Step S506: Sequentially adjusting amplitude of a signal according to the compensation values in a transmission operation of the transceiver circuit. The transmission operation follows the reception operation, and the compensation values determined in Step S504 are respectively applied to different portions of the signal.

In the embodiments of the invention, the proposed transceiver circuit and the corresponding method for compensating for transmission power deviation is able to effectively compensate for the transmission power deviation or offset, so that the packets output by the power amplifier have more stable output power, and the transmission power of different portions of a packet is substantially the same, or the difference in the transmission power of a packet is significantly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver circuit, comprising:
   a counter device, configured to count an execution time of a reception operation and accordingly generate a counting result;
   a compensation circuit, coupled to the counter device and configured to receive the counting result, determine a plurality of compensation values according to the counting result and sequentially output the compensation values in a transmission operation, wherein the transmission operation follows the reception operation; and
   an adjusting circuit, coupled to the compensation circuit and configured to receive the compensation values and sequentially adjust an amplitude of a signal according to the compensation values in the transmission operation, wherein the compensation values are respectively applied to different portions of the signal.

2. The transceiver circuit as claimed in claim 1, wherein the compensation circuit is configured to select a compensation setting from a plurality of compensation settings according to the counting result, the compensation setting comprises the compensation values, and the compensation settings respectively correspond to different lengths of execution time.

3. The transceiver circuit as claimed in claim 1, wherein the adjusting circuit is configured to adjust the amplitude of the signal in digital domain.

4. The transceiver circuit as claimed in claim 1, wherein the compensation values form an increasing sequence.

5. The transceiver circuit as claimed in claim 2, wherein the longer the execution time of the reception operation, the larger the compensation values comprised in the compensation setting corresponding to the execution time.

6. The transceiver circuit as claimed in claim 1, wherein the counter device starts counting the execution time of the reception operation in response to a receiving command and stops counting the execution time when the reception operation is ended.

7. The transceiver circuit as claimed in claim 1, further comprising:
   an antenna, configured to transmit the signal, wherein the signal comprises a packet and a transmission power of a preamble portion of the packet and a transmission power of a data portion of the packet are substantially the same.

8. A method for compensating for transmission power deviation, comprising:
   calculating an execution time of a reception operation of a transceiver circuit;
   determining a plurality of compensation values according to the execution time of the reception operation; and
   sequentially adjusting an amplitude of a signal according to the compensation values in a transmission operation of the transceiver circuit,
   wherein the transmission operation follows the reception operation, and the compensation values are respectively applied to different portions of the signal.

9. The method as claimed in claim 8, wherein step of determining the compensation values according to the execution time of the reception operation further comprises:
   selecting a compensation setting from a plurality of compensation settings according to the execution time, wherein the compensation setting comprises the compensation values, and the compensation settings respectively correspond to different lengths of execution time.

10. The method as claimed in claim 8, wherein the amplitude of the signal is adjusted in digital domain.

11. The method as claimed in claim 8, wherein the compensation values form an increasing sequence.

12. The method as claimed in claim 9, wherein the longer the execution time of the reception operation, the larger the compensation values comprised in the compensation setting corresponding to the execution time.

13. The method as claimed in claim 8, wherein step of calculating the execution time of the reception operation of the transceiver circuit further comprises:
   starting calculating the execution time of the reception operation in response to a receiving command and stopping calculating the execution time when the reception operation is ended.

14. The method as claimed in claim 8, further comprising:
   transmitting the signal through an antenna, wherein the signal comprises a packet and a transmission power of a preamble portion of the packet and a transmission power of a data portion of the packet are substantially the same.

* * * * *